United States Patent [19]
Glasson et al.

[11] Patent Number: 5,110,045
[45] Date of Patent: May 5, 1992

[54] DUAL EXHAUST FLUID FLOW CONTROL DISTRIBUTION APPARATUS

[75] Inventors: Eric J. Glasson, Somerset; Henry Ty, Attleboro, both of Mass.; Alfred J. White, No. Providence; Joseph H. Gondusky, Warwick, both of R.I.

[73] Assignee: Texas Instruments Incorporated, Dallas, Tex.

[21] Appl. No.: 630,676

[22] Filed: Dec. 20, 1990

[51] Int. Cl.⁵ .............................................. G05D 23/08
[52] U.S. Cl. ............................ 236/93 R; 137/625.46; 236/101 D
[58] Field of Search .......... 236/93 R, 101 D; 137/625.46, 876

[56] References Cited

U.S. PATENT DOCUMENTS

| | | | |
|---|---|---|---|
| 1,468,689 | 9/1923 | Ernst | 236/93 R |
| 1,486,381 | 3/1924 | Jaemichen | 236/93 R X |
| 1,711,901 | 5/1929 | Nelson | 236/93 R X |
| 1,798,431 | 3/1931 | McWilliams | 236/93 R |
| 1,806,530 | 5/1931 | Giesler | 236/93 R X |
| 2,177,937 | 10/1939 | Goldschmidt | 137/625.46 X |
| 3,318,524 | 5/1967 | Kehn | 236/101 D X |
| 4,726,452 | 2/1988 | Ty et al. | 236/93 R |

Primary Examiner—William E. Tapolcai
Attorney, Agent, or Firm—Russell E. Baumann; René E. Grossman; Richard L. Donaldson

[57] ABSTRACT

A fluid flow control for an automative transmission system is shown in which a gate, attached to a free end of a thermostatic coil, is caused to slide on a control plate having first and second orifices dependent upon changes in sensed temperature between a position in which one orifice is covered and the other is uncovered and a position in which the one orifice is uncovered and the other is covered and an intermediate position in which one orifice opens as the other closes.

6 Claims, 3 Drawing Sheets

DUAL EXHAUST FLUID FLOW CONTROL DISTRIBUTION APPARATUS

This invention relates generally to valve apparatus for controlling fluid flow and more particularly to such apparatus for controlling the flow of hydraulic fluid in an automotive automatic transmission system.

A conventional transmission system includes a selected pattern of fluidic passageways and chambers in a transmission housing. When an automatic transmission is shifted, fluid flows in certain passageways to effect shifting of the transmission. Control orifices of specific size depending on the viscosity of the fluid and pressure to which it is subjected are employed to provide a smooth shifting function; however, it has been found that as the transmission fluid warms up and becomes less viscous, the fluid flow becomes excessive when shifting from park to first or from neutral to reverse. In U.S. Pat. No. 4,502,627, assigned to the assignee of the present invention, a temperature responsive flow control valve for use in a transmission is disclosed and claimed which compensates for temperature change to supply the optimum amount of fluid to the transmission for proper functioning. The flow control valve comprises a base having a first orifice of a selected minimum area and a second parallel passageway in the form of an elongated slot oriented to lie along an arc of movement of a thermostat metal element carrying a flag which slides on the base so that very small angular movement of the element causes the flag to cross over the entire width of the slot shaped orifice making adjustments in the effective orifice size as the temperature varies between two reference points. Although this valve mechanism is very effective certain transmissions, such as the transaxle, have smaller bottom storage pans resulting in a need to use the transmission fluid more efficiently. With such transmissions the fluid path required at high temperatures can not be cut off at low temperatures and the fluid path at low temperatures can not be used at high temperatures.

It is therefore an object of the invention to provide a fluid distribution system in an automotive transmission having a selected fluid flow in the transmission at elevated temperatures, that is at temperatures above a selected level, and selectively route the flow to a low temperature path at temperatures below the selected level without affecting flow at the elevated temperatures. Another object of the invention is the provision of a fluid flow control valve which can direct fluid flow between first and second paths dependent upon temperature of the fluid which is inexpensive to produce yet reliable in operation.

Other objects and features of the invention will become more readily understood from the following detailed description and appended claims when read with the accompanying drawing in which like reference numerals designate like parts throughout the figures thereof.

Briefly, in accordance with the invention, a control valve has a body with an inlet passage which communicates with first and second outlet passages. A gate element is slidably mounted on a plate having a flat top surface with first and second orifices extending therethrough. A thermostatic coil has one end fixed relative to the body and an opposite end coupled to the plate to move it, dependent upon sensed temperature, from a position in which the first orifice is covered and the second orifice is uncovered and a second position in which the first orifice is uncovered and the second orifice is covered and intermediate positions in which one of the orifices becomes uncovered as the other orifice becomes covered.

DESCRIPTION OF THE PREFERRED EMBODIMENTS

Figure 1:
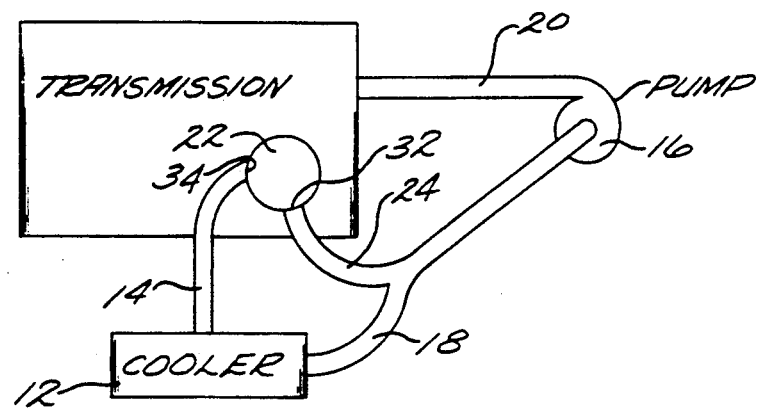
FIG. 1 is a schematic representation of a fluid distribution system employing the invention.
Figure 2:
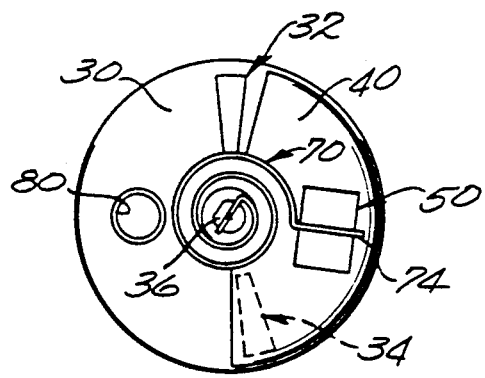
FIG. 2 is a top view of a fluid flow control made in accordance with the invention.
Figure 3:
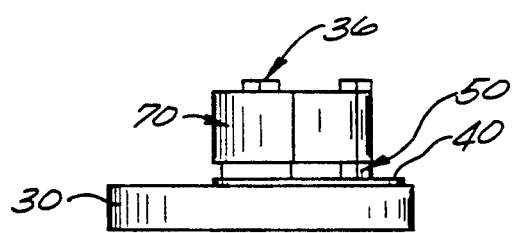
FIG. 3 is a side view of the FIG. 2 valve.

FIG. 1 shows a typical transaxle transmission system in which a valve made in accordance with the invention is used. A transmission 10 has a cooler 12 associated with it to cool transmission fluid directed to it through passageway 14 during normal operating temperatures. After cooling the fluid is pumped from cooler 12 through pump 16 via passageways 18 and 20 back to the transmission. When the fluid in transmission 10 is at certain selected temperatures it is rerouted by valve 22 so that some or all of the fluid bypasses the cooler through passageway 24. That is, fluid flows from a source in the transmission and is directed by valve 22 into selected passageways based on the fluid temperature. When cold the fluid is routed to exhaust orifice 32. At high temperatures the fluid is routed to exhaust orifice 34. At an intermediate temperature range the fluid is directed partially to exhaust 34 and partially to exhaust 32 dependent upon the particular temperature.

Transmission 10 includes a body on which is received a valve plate member 30 having a generally flat top surface and having first and second orifices 32, 34 disposed on opposite sides of a pin 36. Although plate member 30 is shown circular it will be realized that any outer configuration can be employed which will accommodate the location of apertures 32, 34. Orifices 32, 34 are generally slot shaped elongated in a radial direction relative to pin 36 having increasing width with increasing distance from pin 36.

A flag or gate element 40 is slidably received on the top surface of member 30 and is adapted to pivot around pin 36. Gate element 40 is provided with straight edge portions 42, 44 respectively disposed on opposite sides of a bore 46 adapted to receive pin 36. Edge portions 42, 44 are located such that when edge portion 42 lines up with edge 32b of orifice 32, edge portion 44 lines up with edge 34a of orifice 34 and when edge portion 42 lines up with edge 32a of orifice 32, edge portion 44 lines up with edge 34b of orifice 34. Thus as one orifice is covered by gate 40 the other orifice is uncovered.

Figure 4:
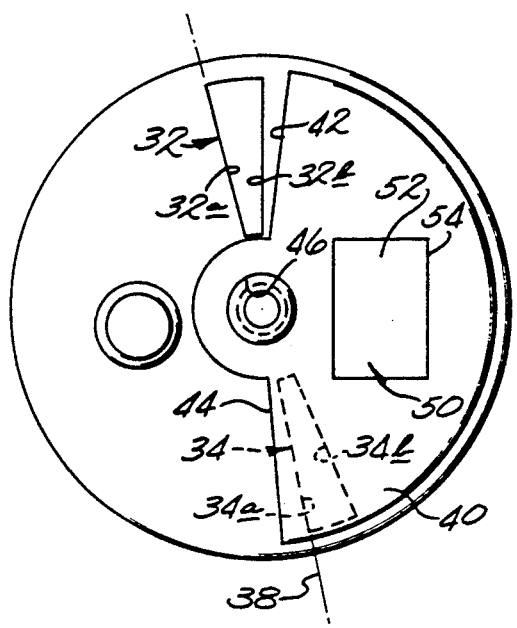
FIG. 4 is an enlarged top view of the FIG. 2 valve with the thermostat coil assembly removed.
Figure 5:
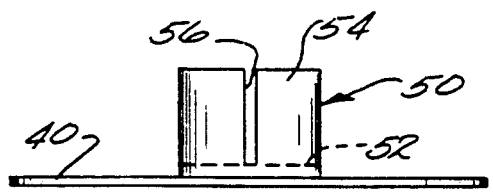
FIG. 5 is a side view of the gate element shown in FIG. 4.
Figure 6:
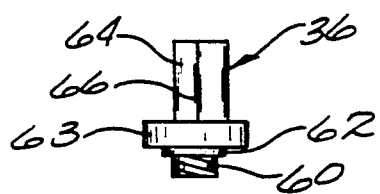
FIGS. 6 and 7 are enlarged front and top views respectively of a guide pin used in the FIG. 2 valve.
Figure 7:
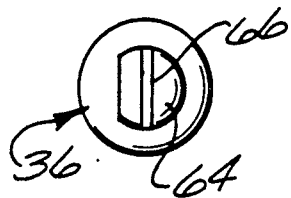
Figure 8:
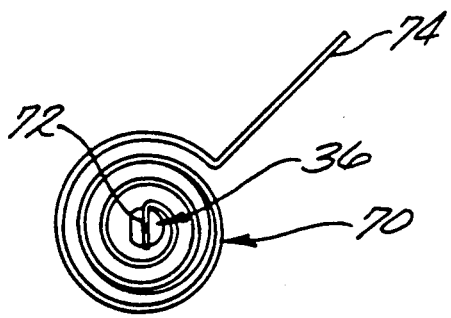
FIG. 8 is a top view of a thermostat coil mounted on the guide pin of FIGS. 6 and 7.

As shown in FIG. 4, edges 32a and 34a lie on an imaginary straight line 38 passing through the center of pin 36 with the apertures located on the same side of the imaginary line 38, however, the location of the orifices can be varied depending upon the particular temperatures at which it is desired to cover and uncover the orifices. Wherever the orifices are located the edges of the gate are adapted to cover and uncover orifices in the same manner as described relative to FIG. 4.

A bracket 50 has a base portion 52 fixedly attached to gate element 40 in any suitable manner, as by welding, and has an upstanding wall 54 formed with a vertically extending slot 56. It will be realized that gate element 40 and bracket could be integrally formed if desired.

Pin 36 has conventional attachment means such as threaded stud 60 which is attached to plate member 30 and a hub portion 62 which is rotatably received in bore 46 of gate 40 and a flange 63 which locks gate 40 in place on plate member 30. An upstanding shank 64 is formed with a vertically extending slot 66 therein.

A thermostat coil 70 has one straight end portion 72 received in slot 66 and a second straight end portion 74 extending in a radial direction relative to pin 36 received in slot 56 of bracket 50. Slot 56 is formed to be sufficiently wide that radial movement of end portion 74 through the slot is permitted as the coil expands and contracts due to changes in temperature so that binding of contiguous wraps of the coil will be avoided which would otherwise cause inconsistent movement of the gate element.

Thus as temperature of the fluid in transmission 10 changes due to environmental changes and operating conditions such changes are sensed by the thermostat metal coil 70 which is thermally coupled to the fluid with the result that the coil either expands or contracts causing end 74 to move either clockwise or counterclockwise and, concomitantly, causing pivotal movement of gate 40. The arrangement is such that for temperatures from a selected minimum up to a first selected temperature orifice 32 will be completely uncovered and orifice 34 will be completely covered and from a second selected higher temperature orifice 34 will be completely uncovered and orifice 32 will be completely covered and for temperatures intermediate the first and second temperatures the orifices 32, 34 opening will vary; however, the total open orifice area will remain substantially the same.

By way of example in one valve made in accordance with the invention orifice 34 is fully covered and orifice 32 is fully uncovered at sensed temperatures from $-40°$ F. to $90°$ F., orifice 34 is fully uncovered and orifice 32 is fully covered at sensed temperatures from $110°$ F. to $300°$ F. and both orifices are variably covered and uncovered between $90°$ F. and $110°$ F.

In some instances depending upon the particular fluid distribution system and transmission with which valve 22 is used it may be desirable to add a third orifice 80 which remains uncovered at all temperatures. If desired stop surfaces can be provided on plate member 30 to limit the angular rotational movement of gate 40.

Although the plate member 30 and gate have been disclosed as having flat mating surfaces it is within the preview of the invention to use a cylindrical surface in which to form the orifices along with a cylindrical gate element as disclosed in U.S. Pat. No. 4,783,000, assigned to the assignee of the present invention.

Although the invention has been described with respect to a specific embodiment, variations and modifications will become apparent to those skilled in the art. It is the intent that the appended claims be interpreted as broadly as possible in view of the prior art to include all such variations and modifications.

We claim:

1. An automotive transmission fluid distribution system for directing fluid to selected paths dependent upon sensed temperature comprising a valve body having an inlet passage and first and second outlet passages, a plate member disposed on the body having a generally flat top surface with first and second orifices, a gate element slidable on the top surface of the plate between a first position in which the first orifice is covered and the second orifice is uncovered and a second position in which the first orifice is uncovered and the second orifice is covered and intermediate positions where one of the first and second orifices becomes uncovered at the other of the first and second orifices becomes covered with the total uncovered orifice area remaining essentially constant and temperature responsive means coupled between the plate member and the gate element to move the element between the first and second positions dependent upon sensed temperature.

2. A fluid distribution system according to claim 1 in which the gate is pivotable about a center and the first and second orifices both have a straight edge which lie on an imaginary line which passes through the center and with the first and second orifices on opposite sides of the center and on the same side of the imaginary line.

3. A fluid distribution system according to claim 1 in which the gate is pivotable about a center and the first and second orifices each has opposed first and second straight edges ad in which the gate element has first and second straight edge portions on opposite sides of the center, the edge portions located so that the first edge portion of the gate element is alignable with the second edge of the first orifice and at the same time the second edge portion of the gate element is alignable with the first edge of the second orifice.

4. A fluid distribution system according to claim 1 in which the temperature responsive means comprises a thermostat metal coil.

5. A fluid distribution system according to claim 4 in which the thermostat metal coil has a straight outer end portion which extends outwardly and is slidably received in a slot formed in a bracket fixedly supported on the plate member.

6. A fluid distribution system according to claim 1 in which the first orifice is covered and the second orifice is uncovered from a selected minimum sensed temperature up to a selected first sensed temperature and the first orifice is uncovered and the second orifice is covered at temperatures above a second selected sensed temperature, higher than the first sensed temperature up to a selected maximum sensed temperature and the first and second orifices are variably covered and uncovered at sensed temperatures intermediate the first and second sensed temperature with the total open orifice area remaining essentially constant.

* * * * *